(12) United States Patent
Patrick et al.

(10) Patent No.: US 8,326,930 B2
(45) Date of Patent: Dec. 4, 2012

(54) VARIATION OF IMAGE CONTENT IN ELECTRONIC MESSAGING PROTOCOL MESSAGES

(75) Inventors: Edward Patrick, Toronto (CA); James Mason, Sherman Oaks, CA (US)

(73) Assignee: j2 Global Communications, Hollywood, CA (US)

( * ) Notice: Subject to any disclaimer, the term of this patent is extended or adjusted under 35 U.S.C. 154(b) by 1589 days.

(21) Appl. No.: 10/873,685

(22) Filed: Jun. 22, 2004

(65) Prior Publication Data

US 2006/0010211 A1 Jan. 12, 2006

(51) Int. Cl.
*G06F 15/16* (2006.01)
(52) U.S. Cl. ........ 709/206; 709/204; 709/227; 709/217; 709/207; 709/205; 709/224
(58) Field of Classification Search .................. 709/200, 709/203, 206, 225, 204; 707/104, 10
See application file for complete search history.

(56) References Cited

U.S. PATENT DOCUMENTS

| | | | |
|---|---|---|---|
| 5,880,740 A | 3/1999 | Halliday et al. | |
| 5,987,480 A | 11/1999 | Donohue et al. | |
| 6,496,849 B1* | 12/2002 | Hanson et al. | 709/200 |
| 6,779,178 B1* | 8/2004 | Lloyd et al. | 717/174 |
| 7,155,482 B2* | 12/2006 | Shinohara et al. | 709/206 |
| 2002/0010794 A1 | 1/2002 | Stanbach Jr. et al. | |
| 2003/0110211 A1* | 6/2003 | Danon | 709/203 |
| 2003/0113038 A1 | 6/2003 | Spencer et al. | |
| 2004/0030719 A1 | 2/2004 | Wei | |
| 2004/0133561 A1* | 7/2004 | Burke | 707/3 |

FOREIGN PATENT DOCUMENTS

| | | |
|---|---|---|
| JP | 2003085167 | 3/2003 |
| JP | 2004046519 | 2/2004 |
| JP | 2004157846 | 6/2004 |
| WO | WO-0225507 A1 | 3/2002 |
| WO | WO-02077768 A2 | 10/2002 |

OTHER PUBLICATIONS

Supplemental European Search Report (dated Jan. 15, 2009), Application No. EP 05 762 331.6, Date Filed—Jun. 21, 2005, (2 pages).
"How to Use Web & E-Mail to Encourage Each Customer's Purchase", Magazine "Top-Promotion's Sales Meeting in Japan", published by Sendenkaigi Co., Ltd., Jul. 1, 2001, July Issue, vol. 39 [One page "Partial Translation . . . " included], (pp. 98-106).
"Must-Read Book for Advertising & Marketing Staff/Business Mail Technique to Get Doubled Response in News2U Corporation", Internet Magazine, published by Impress Corporation, Nov. 1, 2003, November Issue 2003, No. 106 [One page "Partial Translation . . . " included], (pp. 128-135).
PCT International Search Report (dated Oct. 23, 2006)—International Application No. PCT/US05/22081—International Filing Date Jun. 21, 2005 (9 pages).

* cited by examiner

*Primary Examiner* — Jude Jean Gilles
(74) *Attorney, Agent, or Firm* — Blakely, Sokoloff, Taylor & Zafman LLP

(57) ABSTRACT

A number of sets of recipients of an electronic messaging protocol message distribution campaign are identified. Each set can be one or more recipients. Scripting language is added to each message directed to a recipient. The added scripting language refers to a number of image objects/files that have been selected to form a compound image (when juxtaposed). The compound image is unique to one of the sets. Other embodiments are also described and claimed.

13 Claims, 3 Drawing Sheets

VARIATION OF IMAGE CONTENT IN ELECTRONIC MESSAGING PROTOCOL MESSAGES

BACKGROUND

An embodiment of the invention is related to personalizing or customizing targeted electronic messages through variation of their image content.

With the spread of the Internet and the World Wide Web, sending targeted electronic messages, such as email messages, has become an important advertising tool. Software for an online advertising campaign may be designed to apply a set of rules (defined by a business, for example) to a database of customer and demographics information. The software determines when, how, with what content and to whom to send messages, so as to promote further sales for a business or educate the customers of an organization. For example, a targeted email message may have Hypertext Markup Language (HTML) scripts automatically added to it that refer to specific text or images. These would be selected as a function of the message recipient. For example, it might be decided that certain customers should receive a special offer, presented by a predefined combination of text and images. These would be displayed by the recipient's client program upon opening the targeted message.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

Figure 1:
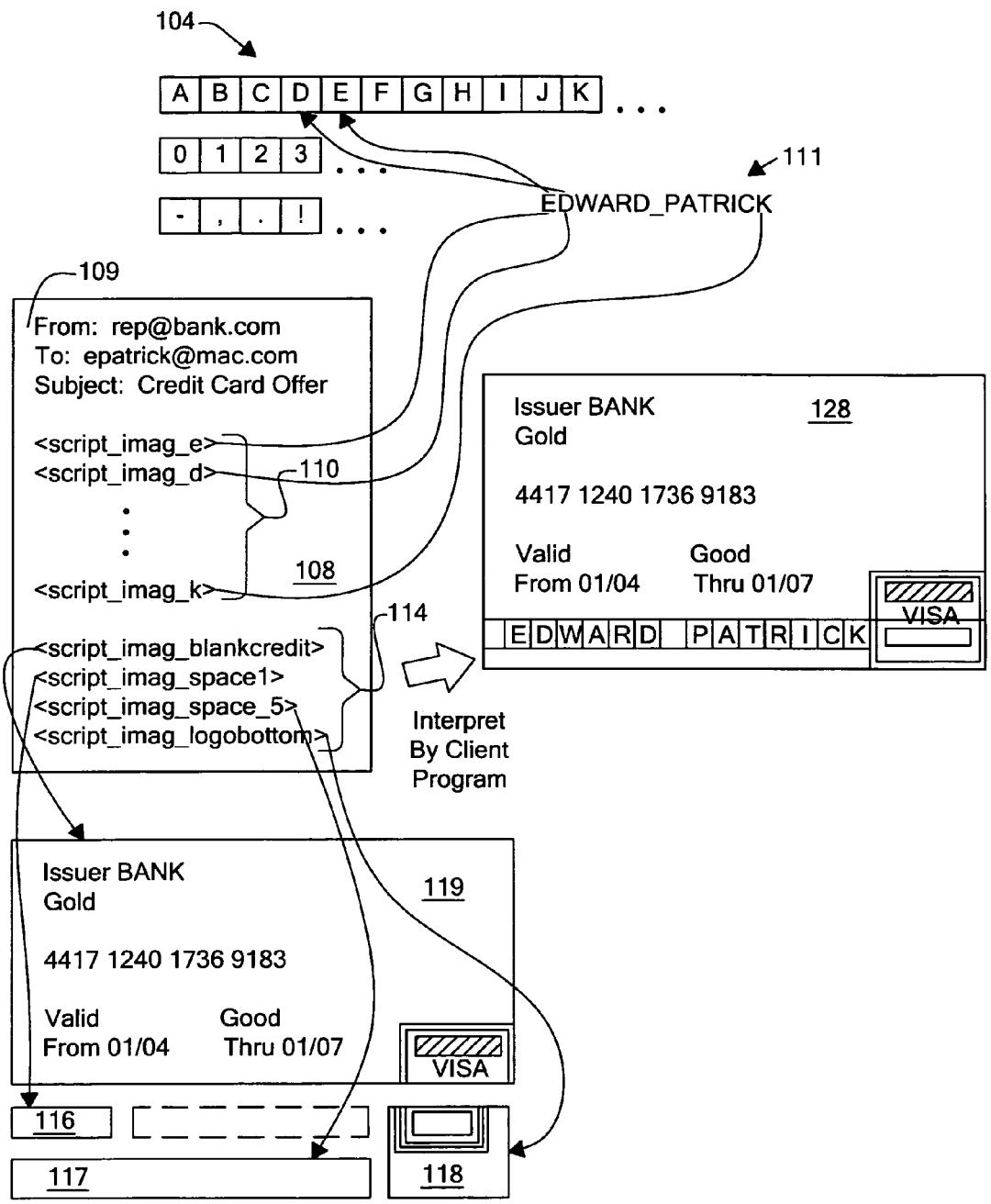
FIG. 1 shows a block diagram of how a message may be personalized with a compound image of in this example a credit card that might be issued to its recipient.

An embodiment of the invention is directed to an email engine that can automatically generate targeted email messages whose image content varies so as to personalize each message for its recipient. For example, FIG. 1 shows a block diagram of how each message may be personalized with an image of a credit card issued to its respective recipient. First, a number of image objects or files 104 may be defined. In this example, each image object 104 contains data needed to display a different one of a number of alphanumeric characters. These characters may, for example, include the twenty-six letters of the English alphabet, decimal numbers 0-9, and some punctuation marks. The image objects 104 may be stored in a database (not shown in FIG. 1) along with other image objects or text that will be used by the email engine, according to rules defined by content authors, to create personalized messages.

Next, consider the situation where an email message 108 is to be personalized with for example a name of its recipient. In addition to the standard headers 109, the email engine will insert certain scripting language, here a set of markup language tags 110, into the message 108. Each tag 110 in the set is selected because it refers to one of the image objects 104 that in turn refers to a character of the recipient's name 111. The tag 110 may for example be an HTML image tag, <img>. Thus, the set of tags 110 as a whole result in, this example, fourteen (14) concatenated images displaying a name of the recipient of the message. The name of the recipient is displayed once the message has been received and interpreted by a client program (used by the recipient).

The above-described technique has the potential benefit of producing such messages, that have customized image content, much faster than manually creating an image object (for each message) that displays the name of its respective recipient. Significant time savings result when there are hundreds or thousands of customers to which such messages are to be sent, such as part of an email advertising campaign.

The technique may be used for example when a bank or credit card issuer has a large number of customers (existing or prospective) selected to receive a special credit card offer. In that case, another set of markup language tags 114 are inserted into the message 108 that refer to one or more additional image objects 116-119 that together define a "blank" or generic credit card from the bank. The area in which the name of the cardholder appears could be left blank as shown, and may be written, in the display monitor, by action of the tags 110. The tags 110, 114 (and their corresponding image objects 104, 116-119) are thus said to be designed such that they result in a "compound" image 128 being displayed, which appears as a credit card that has been issued in the name of the recipient. The tags 110, 114 may be HTML <img> tags that are inserted into an HTML <table> tag. To accommodate names of different lengths (characters), an algorithm may be used that determines which size of "space" image object 116 to use so that the total length given by image object 117 is not exceeded.

Another application of the technique lies in offering each of a relatively large number of selected customers or subscribers of a unified messaging service provider, such as j2 Global Communications of Hollywood, Calif., a box of business cards. The customers may be paying or non-paying subscribers of j2 Global's fax and/or voicemail receive services. With such services, an inbound fax number that may be unique to each selected recipient is assigned, to be used by the recipient to receive voice messages and/or facsimiles. These are captured and forwarded (by the service provider) to the subscriber's email address, in the form of for example an email message attachment. The business cards may be free, or a purchase price may be included in the targeted message. The offer may or may not be contingent upon some action by the customer (e.g., requesting an upgrade in service level). This may be done to for example "publish" the inbound fax number of the recipient, to promote greater use of it so as to generate more sales for the provider, in return for giving away the free box of business cards.

Figure 2:
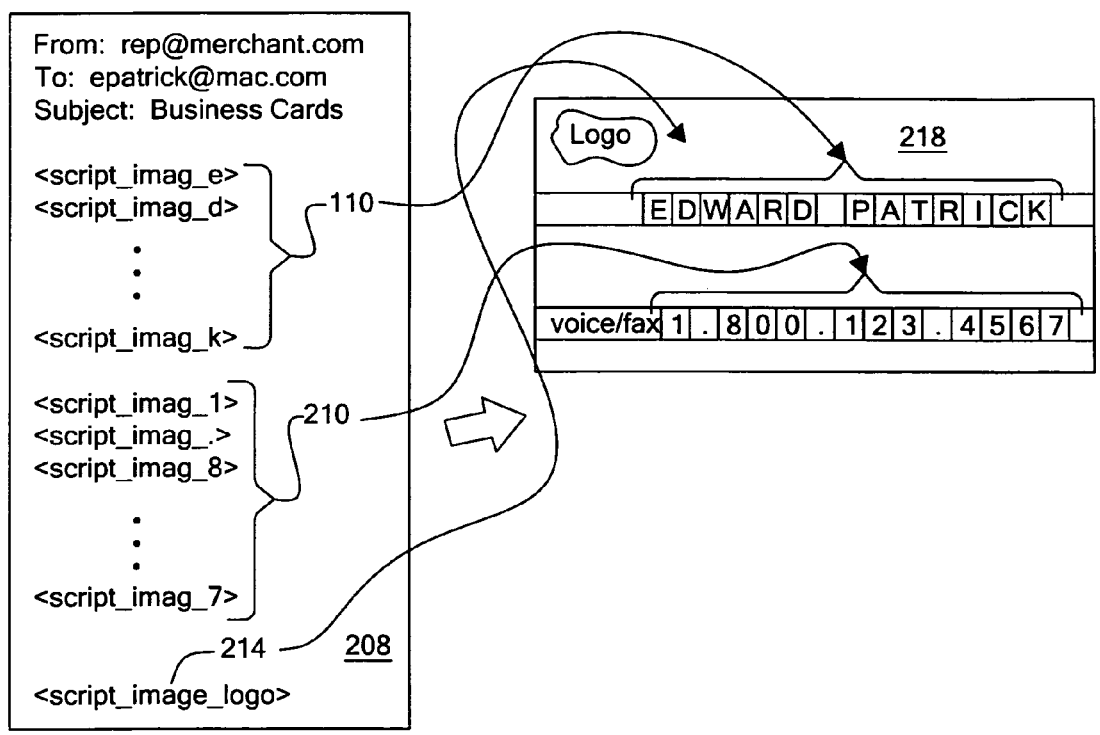
FIG. 2 illustrates another example of compound image, within a targeted message, as a business card of the recipient.

Referring now to FIG. 2, the targeted message 208 once opened by its recipient (who may be a j2 Global customer), displays a compound image 218 of what appears to be a business card of the recipient. The appearing business card may include the name of the recipient as a sequence of concatenated images (e.g., first name, middle initial, and last name in the case where the recipient is a person). These result form the set of tags 110. In addition, an inbound fax number assigned to the recipient may also be displayed (as concatenated images), as a result of the further set of tags 210. The name and fax number objects thus fill the portions of a blank business card that were reserved for the card holder's name and fax number. Additional possibilities include the display of personalized or standard graphical images such as an advertising logo that results from its corresponding tag 214.

The technique described above for personalizing the image content of targeted messages may be used here to advantageously generate a large number of personalized targeted messages, without having to create and store a detailed image of a complete business card that is unique to each recipient. Instead, an image of a generic or blank business card may be created. This image may then be reused for each targeted message. Additional scripting language is inserted to personalize each targeted message, as the message is being generated. This additional scripting language is selected to refer to those predefined image objects that together result in a compound image displaying text strings (such as a name and inbound fax number) which are unique to each selected recipient. Other text strings that are unique to each recipient and that may also be displayed in this manner include a postal mailing address and an email address.

A software process for generating a targeted message on behalf of a merchant or organization may be as follows. First, a database record is accessed, based on search criteria such as a selected recipient's email address. For a merchant, the database record may have at least the following fields: customer name, the customer's email address, and other information about the customer (such as how long a customer, and the extent and type of the customer's use of the merchant's services to date). For the given email address, the email engine looks up the selected recipient's name in the database, and then parses the text that forms the name. An equivalent script is then generated for each detected character. For example, a number of conditional statements such as "if parsed_character=='a' then set equivalent_script <img src="http://hostname/a.gif">" may be predefined, one for each possible character. The generated, equivalent set of scripts forms a compound image of the recipient's name, when interpreted by the recipient's client program. The resulting script inserted into an email message targeted at the subscriber Edward Patrick could be as follows:

<img src="http://hostname/e.gif">
    <img src="http://hostname/d.gif">
    <img src="http://hostname/w.gif">
    <img src="http://hostname/a.gif">
    <img src="http://hostname/r.gif">
    <img src="http://hostname/d.gif">
    <img src="http://hostname/space.gif">
    <img src="http://hostname/p.gif">
    <img src="http://hostname/a.gif">
    <img src="http://hostname/t.gif">
    <img src="http://hostname/r.gif">
    <img src="http://hostname/i.gif">
    <img src="http://hostname/c.gif">
    <img src="http://hostname/k.gif">

When such an email message is opened at the recipient's client program, the program attempts to load each of the image objects from its given resource locator address (in this example, using the http protocol). The loaded image objects are then displayed in the manner specified in the message (e.g., in accordance with a given size/scaling parameter and at a specified location in a window). The image objects could be stored and served by a server of the merchant, or by that of a third party service provider such as Akamai Technologies, Inc. of Cambridge, Mass.

As a further variation to the embodiments described above, the targeted email message that is to be sent to a customer of a first merchant could also be designed to provide the recipient a link to another's Web site. This other Web site may be one owned or administered by a second merchant. For example, an http link could be added to the message such that when the recipient clicks on the business card being displayed in the window of his email client, the recipient's local browser is invoked to load a certain Web page of the second merchant. This second merchant could be the source for the actual business cards and through which the recipient could place further orders for business cards.

An immediate application of the above-described technique is sending targeted email messages by or on behalf of a business to promote its products and/or services. As explained above, the messages are personalized by scripting language defining a compound image that displays a text string (such as a name, fax number, or mailing address) that is unique to each recipient. As an alternative, this technique could also be applied in a more general sense, to personalize other types of image content for purposes other than promoting business. For example, it may be used by a non-profit or educational organization to send out targeted messages whose image content (containing one or more compound images) varies according to some other unique characteristics of the recipient, where the recipient may be a member of the organization for example. These so-called unique characteristics may alternatively be unique to a group of recipients, rather than just one recipient; for example, those recipients residing in the same zip code could be selected to receive the same image content that is different than the others.

Figure 3:
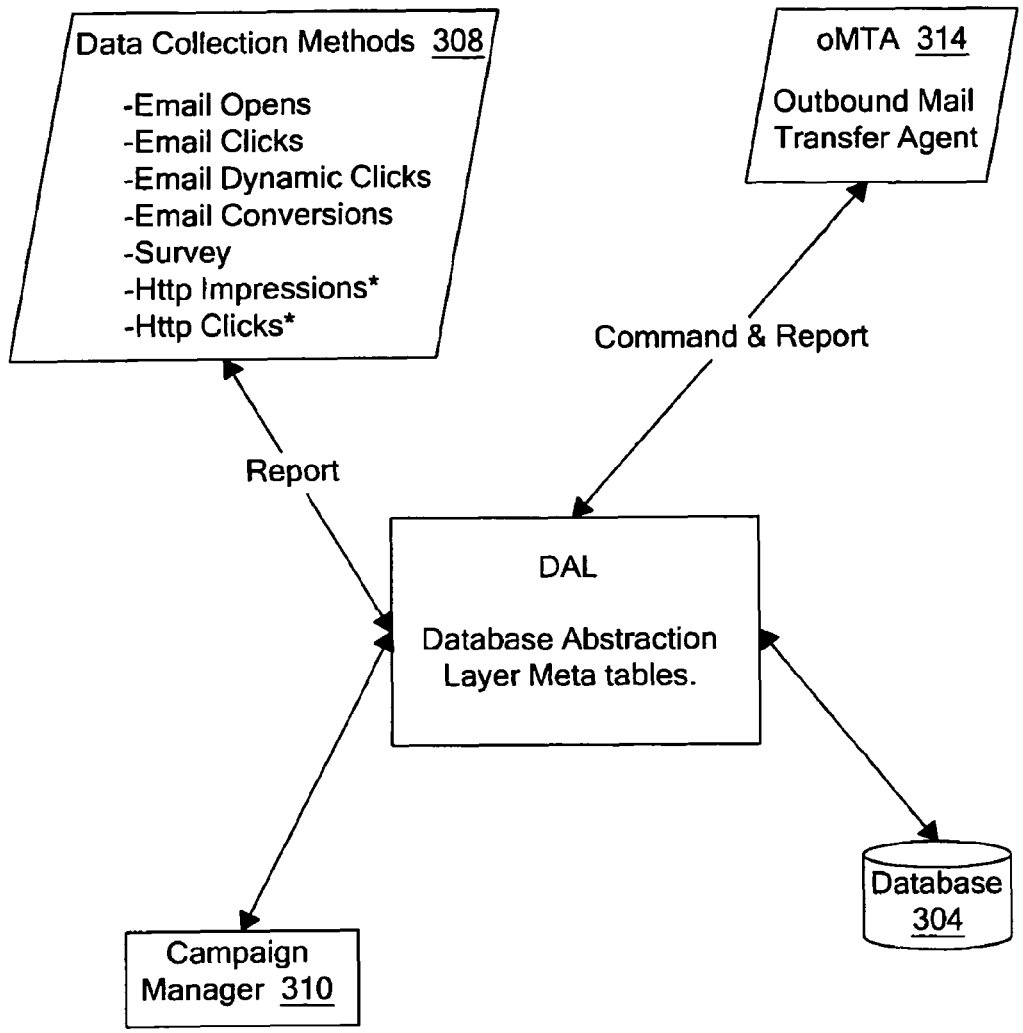
FIG. 3 shows a block diagram of the various software components involved in running an online targeted message campaign.

The methodologies for generating targeted email messages may be implemented by software that is running in a general-purpose computer. FIG. 3 shows such an example software block diagram. A database 304 stores the member records (e.g., customer or subscriber records that list the name, email address, and other member-specific information such as an inbound fax number). The database 304 may also store data collected through the use of data collection methods 308. This collected data may include statistics on customer behavior, observed for example via reported interactions between the customer and a Web site, and interactions between the customer and previously targeted email messages that have been reported back.

The collected data may be used by a campaign manager 310, to select or identify the recipients for a given advertising campaign (from those in the database). The list of selected recipients and descriptions of their respective personalized image content may then be given to an outbound mail transfer agent (oMTA) 314 that contains an email engine such as a Simple Mail Transfer Protocol (SMTP) mail server. The email engine generates the targeted messages, adds the appropriate scripts to describe the personalized compound image, and sends the messages to their respective recipients.

Although different techniques are currently available, a preferred way to generate and send targeted email messages by the mail server is a so-called real-time or sequential process, described using the following example. First, the "from:" field of an email message is filled. This may be done by for example prompting a user to manually enter a source email address, or by receiving the information automatically from another software component (such as the campaign manager 310). The latter may have a list of selected recipients' email addresses (destination addresses), together with one or more source addresses. Next, the mail server checks, using a network communication protocol such as SMTP, whether or not the specified source address is currently valid. If yes, a Sender OK acknowledgement may be displayed or returned. If not, the server may either alert the user and/or stop further processing of the email message until the problem has been corrected. This "SMTP conversation" feature helps avoid wasting time and storage space on generating a message that does not reflect a valid source.

The process then continues with attempting to fill the "to:" field of the message. The needed information here includes a destination email address, obtained via once again either manual user input or by receiving the information automatically from another software component (such as the campaign manager 310). Once again, the server then checks, using a network communication protocol, whether or not the specified destination address can accept messages. If yes, a Recipient OK acknowledgement may be displayed or returned. If not, the server may either alert the user and/or stop further processing of the email message until the problem has been corrected. This feature helps avoid wasting time and storage space on generating a message that may ultimately bounce.

The process then continues with filling the body of the message. Scripting language and/or plain text may be entered into the body, via either manual user input and/or automatically from another program. A special character may be defined to signal the end of this "data" phase. A time and/or date stamp indicating the current time and/or date may be inserted during this data phase. The process then continues with preparing the message to be transmitted, once again either automatically or on command according to manual user input. Subsequent messages may then be generated and transmitted in essentially the same way.

With the above-described real-time technique, since the message is thus guaranteed to be transmitted relatively soon after inserting the time/date stamp, the effect of the stamp may be genuinely felt by the recipient who opens the message not long after the stamp. In contrast, if the message were not being created and transmitted in such a real-time manner, the time/date stamp would become stale if, for example, the recipient's mail server went down for an appreciable period of time after the message had been completed and enqueued.

To summarize, various embodiments of a technique for varying image content across a number of targeted electronic messages has been described. In the foregoing specification, the invention has been described with reference to specific exemplary embodiments thereof. It will, however, be evident that various modifications and changes may be made thereto without departing from the broader spirit and scope of the invention as set forth in the appended claims. For instance, rather than concatenate the images horizontally in a single row as shown in FIGS. 1 and 2, a compound image may be described whose constituent image objects are juxtaposed just vertically, or, in combination, vertically and horizontally. The specification and drawings are, accordingly, to be regarded in an illustrative rather than a restrictive sense.

What is claimed is:

1. A method for creating an email message, comprising:
   a) defining a plurality of image objects/files each containing data to display a different one of a plurality of alphanumeric characters, which are all of the different letters in an alphabet;
   b) querying a database with an email address of a recipient to retrieve a name of the recipient from the database;
   c) parsing the retrieved name to detect a sequence of characters; and
   d) inserting a first set of markup language tags into an email message that is addressed to the email address of the recipient, wherein each tag of the first set of tags refers to one of the plurality of image objects/files so that the first set, once interpreted, results in a plurality of concatenated images displaying the retrieved name of the recipient, wherein each of the plurality of concatenated images is to display a respective one of the detected sequence of characters that forms the name.

2. The method of claim 1 wherein the plurality of alphanumeric characters are letters A-Z of English alphabet and decimal numbers 0-9.

3. The method of claim 2 further comprising:
   inserting a second set of markup language tags into the message, wherein the second set as a whole, once interpreted by a client program of the recipient, results in an image of a credit card being displayed.

4. The method of claim 3 wherein the first and second sets of tags are such that the displayed name and credit card appear as a credit card issued in the name of the recipient.

5. The method of claim 1 further comprising:
   processing a plurality of email messages directed to a plurality of different recipients of an email advertising campaign by repeating b), c) and d) so that each of the plurality of email messages results in a respective plurality of concatenated images displaying a name of a respective recipient.

6. A method for electronic messaging comprising:
   identifying a plurality of sets of recipients of an electronic messaging protocol distribution campaign, each set having one or more recipients;
   querying a database with an email address of a recipient in a set of recipients to retrieve a name;
   parsing the name to detect a sequence of characters that define the name;
   adding scripting language to each of a plurality of messages of the campaign that are directed to said recipients, wherein the added scripting language in each message refers to a plurality of image objects/files that have been selected to form a compound image that, when juxtaposed, is unique to the name, wherein the compound image is unique in that each selected image object file that forms the compound image is a character in the detected sequence of characters that forms the name.

7. The method of claim 6 wherein each set is a single recipient, each selected image object/file is that of a single alphanumeric character in the name of the single recipient, and wherein the compound image shows the name of the single recipient.

8. The method of claim 7 further comprising:
   adding scripting language to each of the messages that results in an image of a credit card being displayed, together with the compound image, wherein the displayed image is that of a credit card that appears to be issued to the single recipient.

9. The method of claim 7 further comprising:
   adding scripting language to each of the messages that results in an image of a business card being displayed, together with the compound image, that appears to be that of the respective recipient's.

10. The method of claim 9 wherein the identified recipients are subscribers/customers of a communications service that delivers incoming facsimiles to a subscriber via an electronic messaging protocol, the method further comprising:
    adding scripting language to each of the messages that results in an inbound fax number, assigned to the single recipient, being displayed as it would appear on a business card.

11. An article of manufacture comprising a non-transitory machine-readable medium with data stored therein that, when accessed by a machine, a) queries a database with an email address of a selected recipient of a plurality of selected recipients m retrieve a name of the selected recipient, b) parses the name of the selected recipient to detect a sequence of characters, and c) generates a plurality of email messages addressed to the plurality of selected recipients, respectively, wherein the email messages are such that when any one of the messages is opened by its selected recipient it displays a compound image, made up of a plurality of concatenated images, wherein the plurality of concatenated images are displayed in accordance with a first set of markup language tags in the email message, each tag refers to a respective one of the plurality of concatenated images and displays a respective one of the detected sequence of characters that forms the name of its selected recipient.

12. The article of manufacture of claim 11 wherein the medium has further data that adds a further script to each of the generated plurality of email messages, wherein said further script refers to a set of image objects/files that contain data needed to display a business card, and wherein said scripts are such that when they have been interpreted they display what appears to be the selected recipient's business card bearing the name of the selected recipient.

13. The article of manufacture of claim 11 wherein the medium has further data that adds a further script to each of the generated plurality of email messages, wherein said further script refers to a set of image objects/files that contain data needed to display a credit card, wherein said scripts are such that upon being interpreted display what appears to be the selected recipient's credit card bearing the name of the selected recipient.

* * * * *

UNITED STATES PATENT AND TRADEMARK OFFICE
CERTIFICATE OF CORRECTION

PATENT NO. : 8,326,930 B2  
APPLICATION NO. : 10/873685  
DATED : December 4, 2012  
INVENTOR(S) : Edward Patric et al.

Page 1 of 1

It is certified that error appears in the above-identified patent and that said Letters Patent is hereby corrected as shown below:

In the Claims, Column 6, Claim 11, line 66, please delete "m" and insert --to--.

Signed and Sealed this
Nineteenth Day of February, 2013

Teresa Stanek Rea
*Acting Director of the United States Patent and Trademark Office*